United States Patent
Miyasa et al.

(10) Patent No.: US 12,367,575 B2
(45) Date of Patent: Jul. 22, 2025

(54) IMAGE PROCESSING APPARATUS, IMAGE PROCESSING METHOD, AND NON-TRANSITORY STORAGE MEDIUM

(71) Applicant: CANON KABUSHIKI KAISHA, Tokyo (JP)

(72) Inventors: Kazuhiro Miyasa, Chiba (JP); Toru Tanaka, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 252 days.

(21) Appl. No.: 17/814,176

(22) Filed: Jul. 21, 2022

(65) Prior Publication Data
US 2023/0032941 A1    Feb. 2, 2023

(30) Foreign Application Priority Data
Jul. 28, 2021    (JP) ................................ 2021-123598

(51) Int. Cl.
G06T 7/00    (2017.01)
G06T 7/30    (2017.01)

(52) U.S. Cl.
CPC ............. G06T 7/0012 (2013.01); G06T 7/30 (2017.01)

(58) Field of Classification Search
CPC ....... G06T 2200/04; G06T 2207/10081; G06T 2207/10088; G06T 2207/10101;
(Continued)

(56) References Cited

U.S. PATENT DOCUMENTS

| | | | |
|---|---|---|---|
| 9,092,691 B1* | 7/2015 | Beaumont | G06V 10/25 |
| 2014/0212014 A1* | 7/2014 | Kim | G06T 3/14 |
| | | | 382/131 |
| 2019/0066280 A1* | 2/2019 | Tanaka | G06T 3/40 |

FOREIGN PATENT DOCUMENTS

| | | |
|---|---|---|
| JP | 2015527108 A | 9/2015 |
| JP | 2017080157 A | 5/2017 |

OTHER PUBLICATIONS

Rueckert et al., "Nonrigid Registration Using Free-Form Deformations: Application to Breast MR Images", IEEE, 1999 (Year: 1999).*

(Continued)

*Primary Examiner* — Ruiping Li
(74) *Attorney, Agent, or Firm* — Canon U.S.A., Inc. IP Division

(57) ABSTRACT

An image processing apparatus includes an acquisition unit configured to acquire first medical image data and second medical image data obtained by imaging a subject, an intermediate deformation information acquisition unit configured to acquire intermediate deformation information obtained by applying registration processing up to a predetermined stage in first registration processing including a plurality of stages to the acquired first medical image data and second medical image data, a determination unit configured to perform determination of a deformation abnormality with respect to the acquired intermediate deformation information, and a deformation unit configured to perform, in a case where the determination unit determines that there is the deformation abnormality, second registration processing different from the first registration processing with respect to the first medical image data and the second medical image data and calculate deformation information.

22 Claims, 5 Drawing Sheets

(58) Field of Classification Search
CPC . G06T 2207/10104; G06T 2207/10108; G06T 2207/10136; G06T 2207/30008; G06T 2207/30096; G06T 7/0012; G06T 7/0016; G06T 7/30; G06T 7/33
See application file for complete search history.

(56) References Cited

OTHER PUBLICATIONS

Ryo Sakamoto et al.; "Temporal Subtraction of Serial CT Images with Large Deformation Diffeomorphic Metric Mapping in the Identification of Bone Metastases;" Radiology: vol. 285: No. 2—Nov. 2017—radiology.rsna.org; pp. 629-639.

* cited by examiner

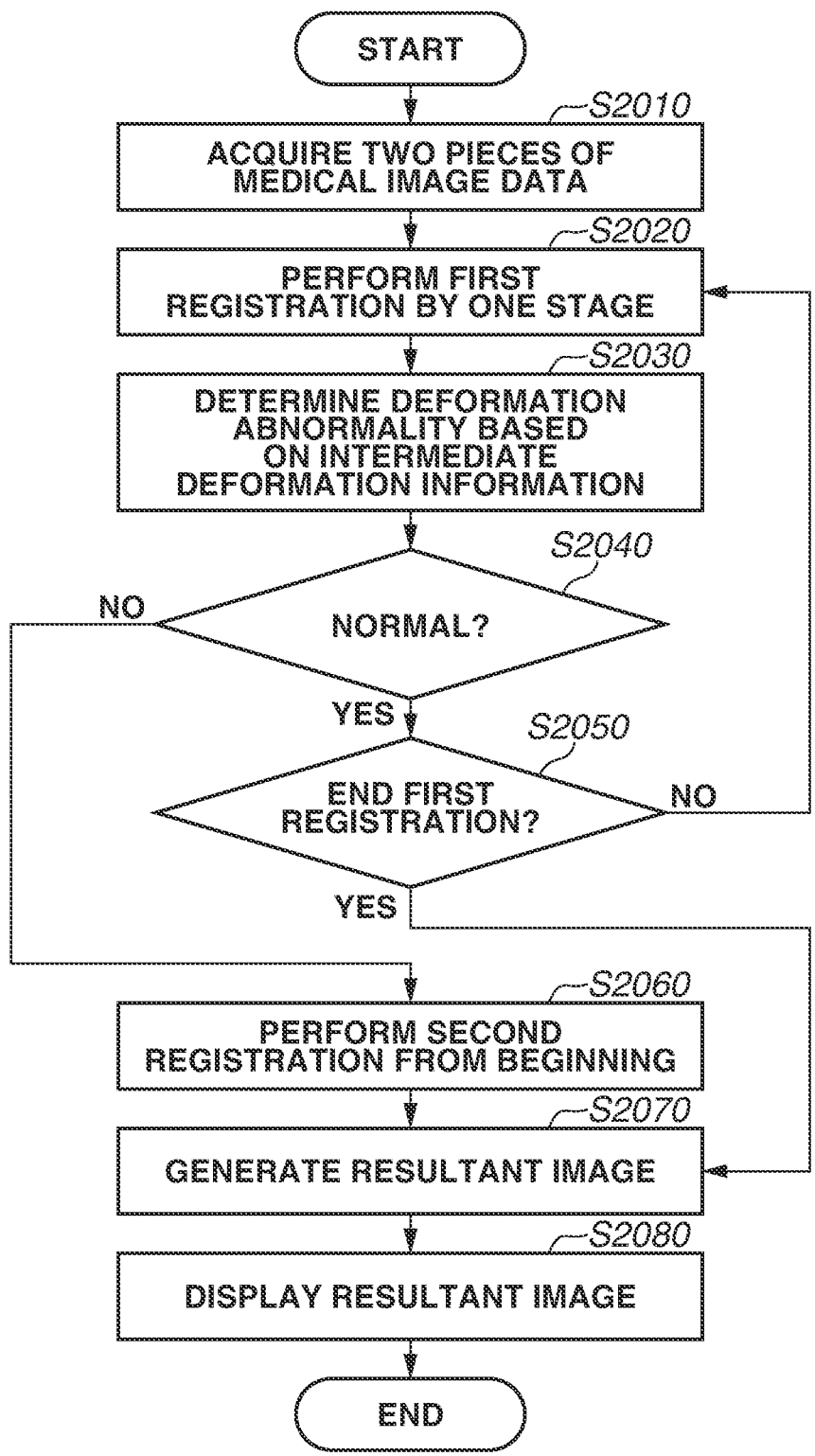

IMAGE PROCESSING APPARATUS, IMAGE PROCESSING METHOD, AND NON-TRANSITORY STORAGE MEDIUM

BACKGROUND

Field of the Disclosure

The disclosure relates to an image processing apparatus that performs registration between pieces of medical image data, an image processing method, and a non-transitory storage medium.

Description of the Related Art

Visualizing a change over time in a lesion or the like has been studied for use in the medical field to provide to a user subtraction image data generated from two pieces of medical image data acquired by imaging a subject at times different from each other using various modalities.

Sakamoto, Ryo. et al. "Temporal Subtraction of Serial CT Images with Large Deformation Diffeomorphic Metric Mapping in the Identification of Bone Metastases." *Radiology* Nov, 285(2)(2017): 629-639 discloses a technique for registration between two pieces of three-dimensional medical image data acquired by imaging a subject using a computed tomography (CT) apparatus to generate subtraction image data. The technique for registration between pieces of medical image data is utilized, in addition to the purpose of generating subtraction image data, under various scenes, for example, an overlay display, a comparison, an analysis, and the like of a plurality of pieces of medical image data.

However, in a case where the position or the posture of the subject is considerably different between the pieces of medical image data, using a registration technique, like Sakamoto et al., highly accurate registration may be difficult to be performed on anatomical structures corresponding each other between pieces of medical image data.

SUMMARY

In consideration of the above-described issue, the present invention is directed to providing an image processing technique of performing registration highly accurately between pieces of medical image data.

According to an aspect of the present invention, an image processing apparatus includes an acquisition unit configured to acquire first medical image data and second medical image data obtained by imaging a subject, an intermediate deformation information acquisition unit configured to acquire intermediate deformation information obtained by applying registration processing up to a predetermined stage in first registration processing including a plurality of stages to the acquired first medical image data and second medical image data, a determination unit configured to perform determination of a deformation abnormality with respect to the acquired intermediate deformation information, and a deformation unit configured to perform, in a case where the determination unit determines that there is the deformation abnormality, second registration processing different from the first registration processing with respect to the first medical image data and the second medical image data and calculate deformation information.

Further features of the present invention will become apparent from the following description of exemplary embodiments with reference to the attached drawings.

BRIEF DESCRIPTION OF THE DRAWINGS

FIG. 5 is a flowchart illustrating a processing procedure for registration according to a second exemplary embodiment.

DESCRIPTION OF THE EMBODIMENTS

In the following description, exemplary embodiments of the present invention will be described in detail with reference to the attached drawings. However, the exemplary embodiments that will be described below do not limit the present invention defined according to the claims, and not all of combinations of characteristics that will be described in the present exemplary embodiments are necessarily essential to a solution of the present invention.

An image processing apparatus according to a first exemplary embodiment is an apparatus that performs registration between two pieces of medical image data captured at times different from each other, and generates subtraction image data or the like. More specifically, the image processing apparatus performs determination of an abnormality with respect to intermediate deformation information obtained as a result of registration processing applied to two pieces of image data up to a predetermined stage in first registration processing including a plurality of stages. In a case where the image processing apparatus determines that there is an abnormality, the image processing apparatus employs second registration processing, which is different from the first registration processing including the plurality of stages of registration processing and is less likely leads to the abnormality, and performs the registration using the second registration processing on the two pieces of medical image data from the beginning. As will be used herein, the registration processing at the predetermined stage refers to registration processing at a stage that is not registration processing at the final stage among the plurality of stages of the registration processing.

Figure 1:
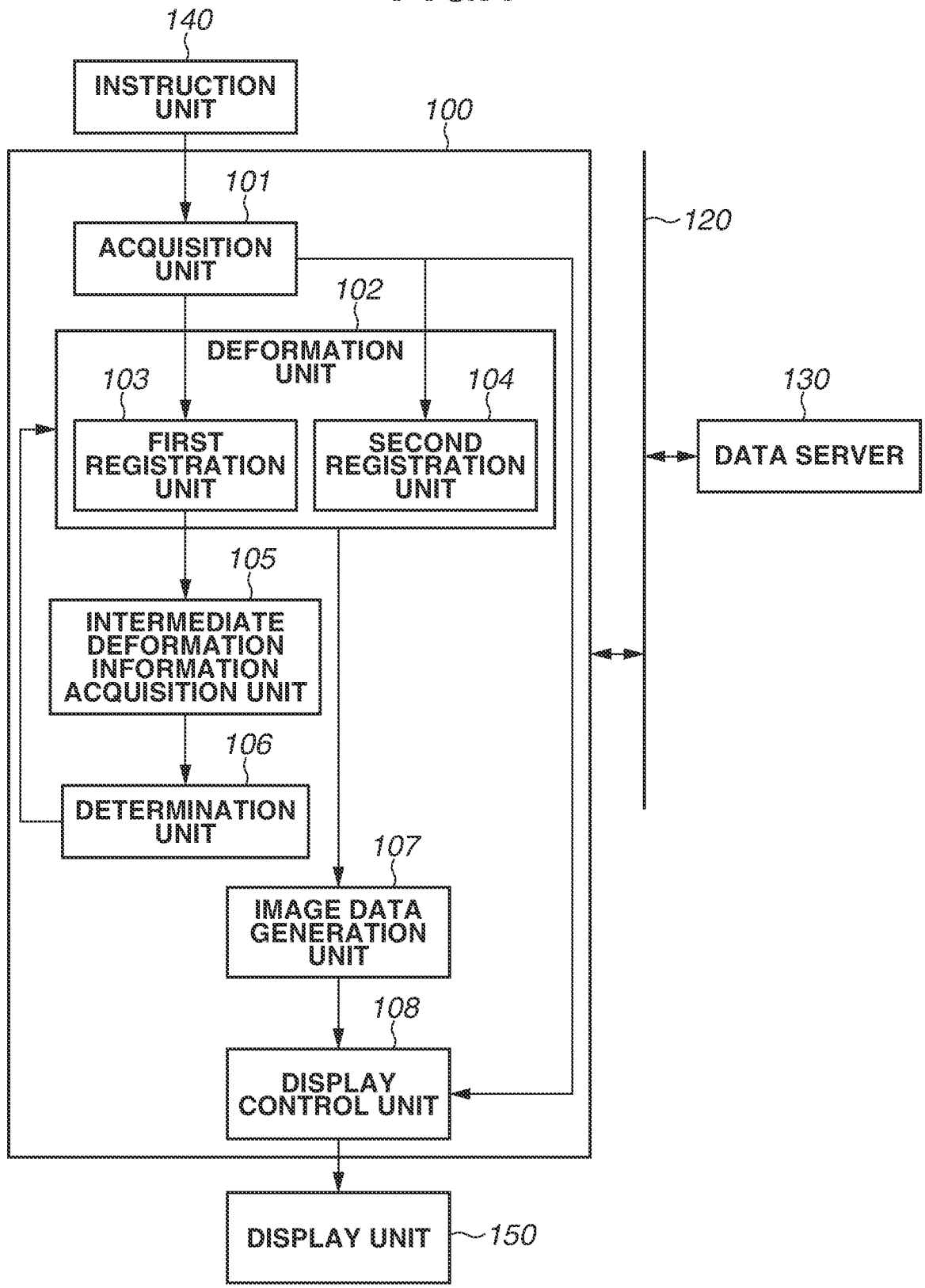
FIG. 1 is a diagram illustrating a functional configuration of an image processing system according to a first exemplary embodiment.

FIG. 1 is a diagram illustrating a configuration of an information processing system according to the present exemplary embodiment. The image processing system includes an image processing apparatus 100, and the image processing apparatus 100 is connected to a data server 130 via a network 120. The image processing apparatus 100 according to the present exemplary embodiment performs registration between two pieces of medical image data (first medical image data and second medical image data) acquired by imaging a subject at times different from each other. Then, the image processing apparatus 100 is an apparatus that generates subtraction image data or the like between the first medical image data and the second medical image data, based on a result of the registration.

The data server 130 stores a plurality of pieces medical image data. The data server 130 indicates, for example, a Picture Archiving and Communication System (PACS) that receives medical image data captured using a modality and stores and manages the medical image data via a network. A description will be given of a case where a plurality of pieces of three-dimensional tomographic image data acquired by imaging the subject under conditions different from each other (different modalities, imaging modes, imaging dates and times, body postures, and the like) is stored in the data server 130 as the first medical image data and the second medical image data. In the present exemplary embodiment, the first medical image data and the second medical image data are three-dimensional tomographic image data (three-dimensional medical image data) acquired by imaging the subject using an X-ray computed tomography (CT) apparatus.

In the present specification, an axis indicating the direction from the right hand to the left hand of the subject, an axis indicating the direction from the front side to the back side of the subject, and an axis indicating the direction from the head to the foot of the subject are defined to be an X axis, a Y axis, and a Z axis, respectively. An XY cross section, a YZ cross section, and a ZX cross section are defined to be an axial plane, a sagittal plane, and a coronal plane, respectively. In other words, the X-axis direction is a direction perpendicular to the sagittal plane (hereinafter referred to as a sagittal direction). The Y-axis direction is a direction perpendicular to the coronal plane (hereinafter referred to as a coronal direction). Further, the Z-axis direction is a direction perpendicular to the axial plane (hereinafter referred to as an axial direction).

In the above-described coordinate system, in a case of a CT image configured as a set of pieces of two-dimensional tomographic image data (slice images), the slice plane of the image indicates the axial plane and a direction perpendicular to the slice plane (hereinafter referred to as a slice direction) indicates the axial direction. How the coordinate system is set is merely an example, and may be defined in a different manner therefrom.

The modality that captures the three-dimensional tomographic image may be a magnetic resonance imaging (MRI) apparatus, a three-dimensional ultrasonic imaging apparatus, a photoacoustic tomography apparatus, a positron emission tomography (PET)/single-photon emission computerized tomography (SPECT) apparatus, an optical coherence tomography (OCT) apparatus, or the like. Further, the first medical image data and the second medical image data may be any medical image data as long as they are three-dimensional tomographic image data that can be set as a target for the registration. For example, the first medical image data and the second medical image data may be images captured at the same timing using different modalities or in different imaging modes. The first medical image data and the second medical image data may be pieces of medical image data acquired by imaging the same subject using the same modality, in the same body position, and at different dates and times for follow-up monitoring. The first medical image data and the second medical image data are each three-dimensional medical image data (three-dimensional tomographic image data) configured as a set of pieces of two-dimensional tomographic image data. In the present exemplary embodiment, the position and the posture in each piece of two-dimensional tomographic image data are stored in the data server 130 after being converted into a reference coordinate system (a coordinate system in a space with the subject set as a reference). In this case, the first medical image data and the second medical image data expressed in the reference coordinate system are input to the image processing apparatus 100 according to an instruction issued from a user operating an instruction unit 140.

The instruction unit 140 includes, for example, a mouse, a keyboard, and/or a button.

The image processing apparatus 100 is an apparatus that performs image processing in response to receipt of a processing request issued from the user via the instruction unit 140, outputs a result of the processing to a display unit 150, and functions as a terminal apparatus for radiologic interpretation that the user, such as a doctor, operates. More specifically, the image processing apparatus 100 acquires the first medical image data and the second medical image data targeted for the image processing from the data server 130 as a pair of pieces of medical image data, based on the instruction issued from the user via the instruction unit 140. Then, the image processing apparatus 100 performs processing for registering the pair of these pieces of medical image data to obtain a subtraction image, and generates subtraction image data or the like of the subtraction image between the first medical image data and the second medical image data, based on a result of the registration, and outputs the subtraction image data to the display unit 150.

The image processing apparatus 100 includes the configuration that will be described below.

An acquisition unit 101 acquires information of the first medical image data and the second medical image data input to the image processing apparatus 100.

A deformation unit 102 includes a first registration unit 103 and a second registration unit 104, and performs registration processing on the medical image data acquired by the acquisition unit 101 and calculates deformation information. The first registration unit 103 included in the deformation unit 102 performs the registration processing for registration between the first medical image data and the second medical image data using a first registration method including a plurality of stages. Then, the first registration unit 103 transmits, to an intermediate deformation information acquisition unit 105, intermediate deformation information obtained at a predetermined stage in the registration processing. The registration processing at the predetermined stage refers to registration processing that is not registration at the final stage among the plurality of stages.

The intermediate deformation information acquisition unit 105 transmits, to a determination unit 106, the intermediate deformation information acquired from the deformation unit 102 as a result obtained by applying the registration processing up to the predetermined stage in the first registration processing including the plurality of stages. The intermediate deformation information refers to a displacement field storing therein a displacement vector for mapping between pixels included in the first medical image data and the second medical image data.

The determination unit 106 performs the determination of a deformation abnormality with respect to the acquired intermediate deformation information, and transmits a result of the determination to the deformation unit 102. More specifically, the determination unit 106 determines whether there is an abnormality in the registration, based on the displacement field corresponding to the intermediate deformation information, and transmits the result of the determination to the deformation unit 102.

In a case where the determination unit 106 determines that there is no abnormality in the intermediate deformation information, the deformation unit 102 causes the first registration unit 103 to perform registration processing, which is subsequent to the predetermined stage and included in the first registration processing, based on the intermediate deformation information. On the other hand, in a case where the determination unit 106 determines that there is an abnormality in the intermediate deformation information, the deformation unit 102 causes the second registration unit 104 to perform second registration processing on the first medical image data and the second medical image data. Further, the deformation unit 102 does not perform the registration processing subsequent to the predetermined stage, which is performed in the first registration unit 103.

The second registration unit 104 performs the registration processing for registration between the first medical image data and the second medical image data using a second registration method, and calculates a displacement field between the pieces of medical image data obtained by the registration processing. In the second registration processing by the second registration unit 104, registration processing is performed not using, as an input, the intermediate deformation information obtained by the first registration processing.

An image data generation unit 107 generates deformed image data of the second medical image data by deforming the second medical image in a way by bringing the second medical data into alignment with the first medical image data based on the acquired displacement field. Further, the image data generation unit 107 generates the subtraction image data obtained by registration between the first medical image data and the deformed image data of the second medical image data, as resultant image data.

A display control unit 108 performs control of outputting the generated subtraction image data, deformed image data, and the like to the display unit 150.

The display unit 150 includes any types of display devices, such as a liquid crystal display (LCD) and a cathode ray tube (CRT), and displays medical image data and the like for radiogram interpretation. More specifically, the display unit 150 displays, for example, cross-sectional image data of the first medical image data and the second medical image data acquired from the image processing apparatus 100. The display unit 150 displays cross-sectional image data of the deformed image data and/or cross-sectional image data of the subtraction image data generated by the image processing apparatus 100. The medical image data displayed by the display unit 150 can be appropriately combined or changed. Further, the display unit 150 may be configured as a device integrated with the image processing apparatus 100.

The registration between the pieces of medical image data by the image processing apparatus 100 according to the present exemplary embodiment refers to processing for calculating deformation information that is used for displacing the pixel position of a pixel included in one of the pieces of medical image data to a corresponding pixel position in the other of the pieces of medical image data.

A description will be given of a case where there are two pieces of medical image data captured at times different from each other. With respect to the pixel position of a first pixel included in the first medical image data set as a reference, a pixel position corresponding to the pixel position of the first pixel is estimated from among pixels included in the second medical image data. Then, the image processing apparatus 100 calculates, as the deformation information, a displacement field from one of the pieces of medical image data set as the reference to the other of the pieces of medical image data. In the present exemplary embodiment, the displacement field between the pieces of three-dimensional tomographic image data is a three-dimensional vector field storing therein a displacement vector in each of the X, Y, and Z directions at the pixel position of the pixel included in the medical image data. The medical image data set as the reference for the registration (fixed image data) will be referred to as reference image data, and the other medical image data (image data to be deformed) will be referred to as floating image data. In the present exemplary embodiment, the first medical image data and the second medical image data are treated as the reference image data and the floating image data, respectively.

Figure 2:
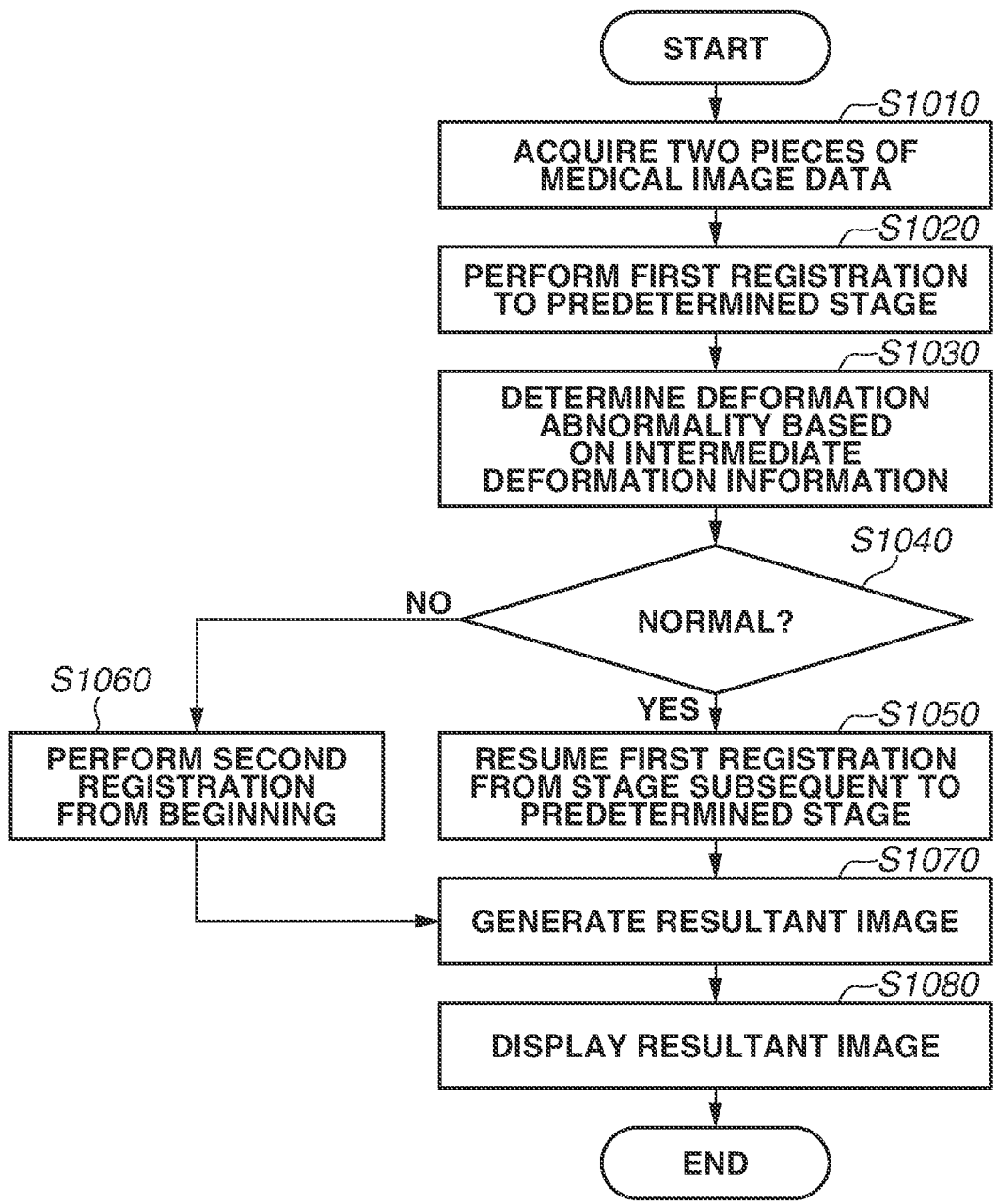
FIG. 2 is a flowchart illustrating a processing procedure for registration according to the first exemplary embodiment.

FIG. 2 is a flowchart illustrating a processing procedure for the registration between the pieces of medical image data that is performed by the image processing apparatus 100. Steps that will be described below may be realized as an image processing system including a plurality of image processing apparatuses. Alternatively, the image processing apparatus 100 may perform a specific step and transmit a result of the step to another image processing apparatus.

(S1010) (Acquire Two Pieces of Medical Image Data)

In step S1010, the acquisition unit 101 acquires the first medical image data and the second medical image data specified by the user via the instruction unit 140 from the data server 130. Then, the acquisition unit 101 outputs the acquired first medical image data and second medical image data to the first registration unit 103 of the deformation unit 102 and the display control unit 108. While, in the present exemplary embodiment, the acquisition of the medical image data by the acquisition unit 101 is performed based on the user's instruction, the acquisition may be performed by any other method.

(S1020) (Perform First Registration Processing up to Predetermined Stage)

In step S1020, the first registration unit 103 of the deformation unit 102 performs the first registration processing for performing the registration in a way by substantially aligning pixels indicating the same site between the first medical image data and the second medical image data. The first registration unit 103 performs the registration processing up to the predetermined stage in the first registration processing including the plurality of stages, and transmits a result of the registration processing to the intermediate deformation information acquisition unit 105. The intermediate deformation information acquisition unit 105 acquires the intermediate deformation information, which is the deformation information at the predetermined stage, and transmits the intermediate deformation information to the determination unit 106. In the present exemplary embodiment, the intermediate deformation information acquisition unit 105 acquires the displacement field that maps the positions of the pixels included in both the images at the predetermined stage in the registration, as the intermediate deformation information from the first registration unit 103. The registration processing at the predetermined stage refers to registration processing that is not the registration at the final stage among the plurality of stages of registration processing.

In the present exemplary embodiment, the first registration processing by the first registration unit 103 is performed by a known image processing method that uniformly evaluates the entire medical image data. Examples of the method include deforming one of the images to increase image similarity between the pieces of medical image data. Examples usable as the image similarity include known methods, such as Sum of Squared Differences (SSD), mutual information, and a cross-correlation coefficient, which are generally employed. Examples usable as the model for deforming the image data include known models, such as the affine transformation, Free Form Deformation (FFD), the Demons algorithm, and Large Deformation Diffeomorphic Metric Mapping (LDDMM).

In the present exemplary embodiment, the first registration processing by the first registration unit 103 includes the plurality of stages. For example, the first registration unit 103 performs multiresolution registration processing that transitions from registration processing between pieces of input image data at low resolutions to registration between pieces of input image data at high resolutions sequentially to enhance the robustness of the registration.

The multiresolution registration by the first registration unit 103 is performed according to a procedure of calculating the displacement field by the registration processing at each resolution and applying the displacement field to the input image at the next resolution. Due to this procedure, the first registration unit 103 can output the displacement field resolution by resolution. In this process, the intermediate deformation information acquisition unit 105 employ a stage corresponding to a predetermined resolution in the multiresolution registration as the predetermined stage in the first registration processing, to acquire a displacement field obtained by registration at the resolution corresponding to the predetermined stage, as the intermediate deformation information. For example, in a case of multiresolution registration including five stages, the intermediate deformation information acquisition unit 105 can acquire a displacement field obtained by registration at a resolution corresponding to the third stage set as the predetermined stage, as the intermediate deformation information.

In the first registration processing by the first registration unit 103, the processing including the plurality of stages does not necessarily have to be the multiresolution registration. The first registration processing by the first registration unit 103 may be processing in which different types of registration methods are sequentially combined. For example, in a case where the first registration unit 103 performs the registration in the order of the affine registration and the above-described FFD and LDDMM methods in this order, and when the predetermined stage is set to the second stage, the intermediate deformation information acquisition unit 105 can be configured to acquire a displacement field obtained by FFD, as the intermediate deformation information. The first registration processing including the plurality of stages by the first registration unit 103 may be an iterative calculation in optimization processing. Generally, in the registration method that deforms medical image data to increase the image similarity between pieces of medical image data, the image similarity is used as an evaluation function and an iterative calculation is conducted to minimize (or maximize) the evaluation function. In this case, because the displacement field can be generated at each step in the iteration, the intermediate deformation information acquisition unit 105 can be configured to acquire a displacement field at a step corresponding to the predetermined stage in the iterative calculation, as the intermediate deformation information. For example, the intermediate deformation information acquisition unit 105 can acquire a displacement field at the 50th step in the iterative calculation as the intermediate deformation information.

The intermediate deformation information calculated by the first registration unit 103 is not necessarily limited to the displacement field, and may be any information that can be used for mapping positions between the pieces of medical image data. For example, the intermediate deformation information calculated in the first registration processing by the first registration unit 103 may be a combination of a deformation model based on a B-spline curve, and the positions and control amounts of control points arranged at predetermined intervals in the medical image data, which is used in FFD. In this case, the intermediate deformation information acquisition unit 105 can acquire a displacement at any position in the medical image data using the B-spline curve based on the positions and control amounts of the control points.

(S1030) (Determine Deformation Abnormality Based on Intermediate Deformation Information)

In step S1030, the determination unit 106 detects a locally abnormally deformed region in the intermediate deformation information. In other words, the determination unit 106 performs determination of whether there is an abnormality, with respect to a local region in the displacement field. For example, in the case where the intermediate deformation information is the displacement field, the determination unit 106 generates a Jacobian map indicating a volume change in the displacement field and detects a region having a locally considerable volume change. A Jacobian matrix J (x, y, z) at a predetermined position (x, y, z) in the Jacobian map of the displacement field can be calculated according to the following equation:

$$J = \det \begin{pmatrix} \frac{\partial Fx}{\partial x} & \frac{\partial Fx}{\partial y} & \frac{\partial Fx}{\partial z} \\ \frac{\partial Fy}{\partial x} & \frac{\partial Fy}{\partial y} & \frac{\partial Fy}{\partial z} \\ \frac{\partial Fz}{\partial x} & \frac{\partial Fz}{\partial y} & \frac{\partial Fz}{\partial z} \end{pmatrix}, \quad (1)$$

where displacement fields in the X, Y, and Z directions are Fx(x, y, z), Fy(x, y, z), and Fz(x, y, z), respectively, while, in the above equation, the input coordinates (x, y, z) are omitted.

According to the above equation, the Jacobian matrix J has a value 1 if the volume does not locally change, a value smaller than 1 (a positive decimal) if the volume reduces, and a value greater than 1 if the volume increases. Accordingly, in the present step, the determination unit 106 determines an abnormally deformed region by a determination using a threshold value based on the value of the Jacobian matrix J. More specifically, the determination unit 106 determines, in a case where the condition expressed by the following equation is satisfied, that the position (x, y, z) is a region having an abnormal volume change, i.e., an abnormally deformed region.

$$|\log_2 J| > Th_1 \quad (2)$$

Then, the determination unit 106 can convert the Jacobian matrix J into 0 if the volume does not change, a negative value if the volume reduces, and a positive value according to an increase in the volume, by calculating a logarithm with respect to the Jacobian matrix J. Further, factors for the reduction and the increase in the volume, which are in the opposite relationship, can be handled as positive and negative values equal in magnitude. More specifically, if $\log_2$ is calculated with respect to a volume reduction factor of 0.5 and an increase factor of 2.0 in the opposite relationship of the volume reduction factor, this calculation yields −1 and +1, respectively, resulting in positive and negative values 1 equal in magnitude. Then, the factors for the reduction and the increase in the volume can be converted into values on the same scale by calculating absolute values of these values. $Th_1$ represents the predetermined threshold value, and, for example, $Th_1$=0.5, and in a case where the local volume change does not fall within a range of approximately 0.7 times to approximately 1.4 times according to the equation (2), the determination unit 106 determines that the volume change is an abnormal volume change. In other words, the determination unit 106 determines whether there is a deformation abnormality, based on the information about the volume change in the displacement field.

Figure 3:
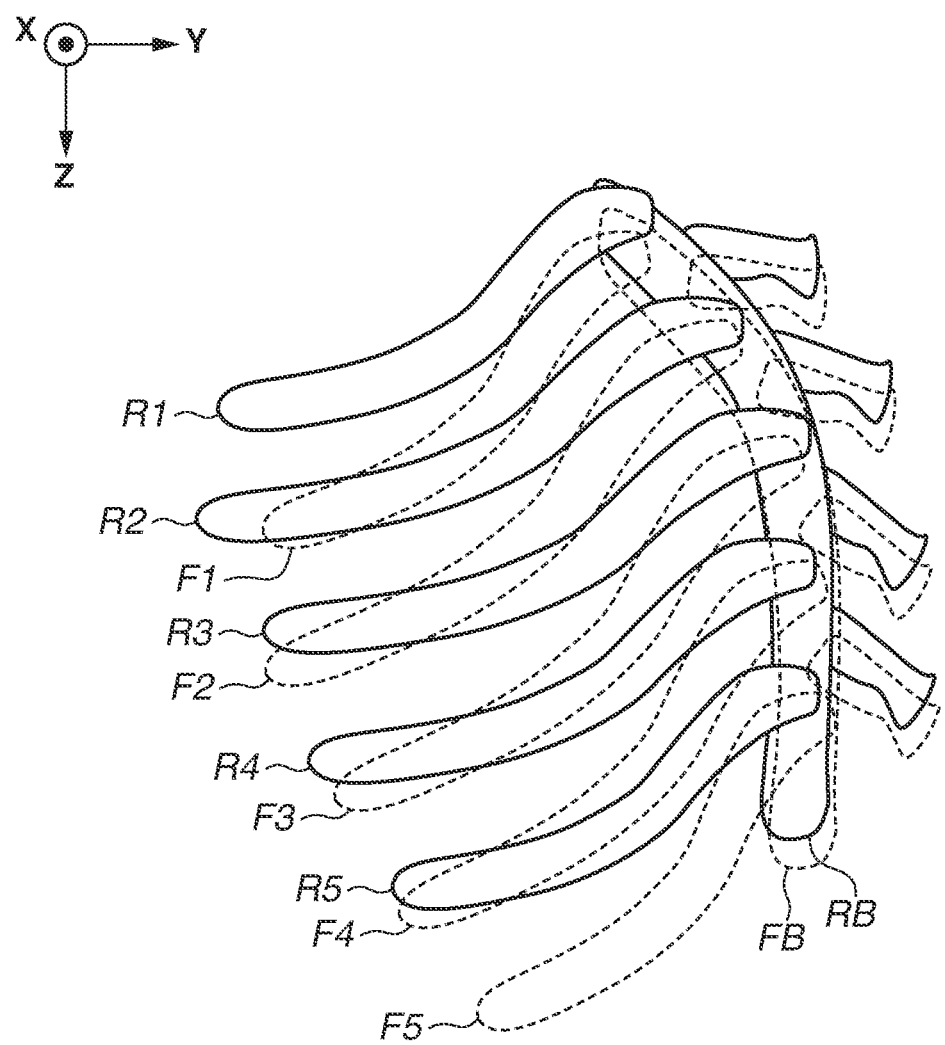
FIG. 3 is a diagram illustrating an example of a positional relationship on ribs between images before registration.
Figure 4:
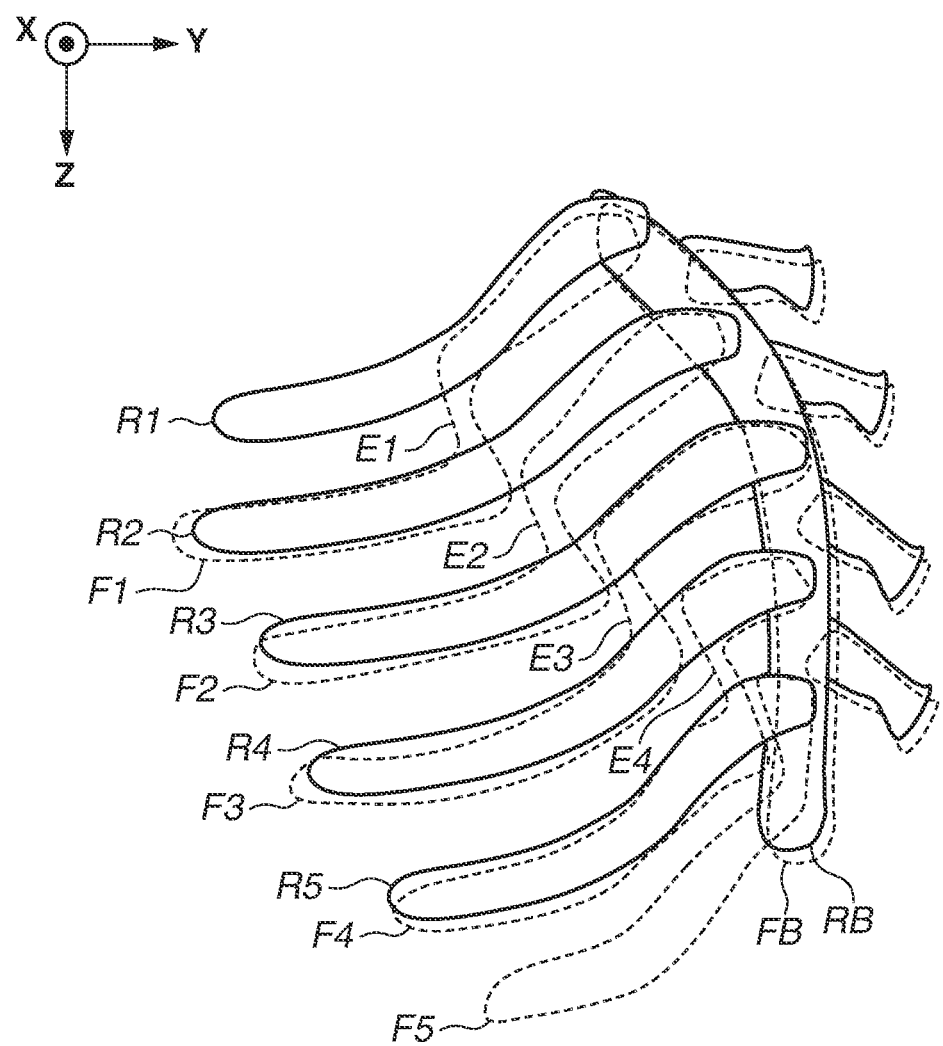
FIG. 4 is a diagram illustrating an example of a positional relationship on the ribs between the images at a predetermined stage in the registration.

A description will be given of a specific example of a target site of the registration in the medical image data and a deformation abnormality that occurs in the intermediate deformation information, with reference to the drawings. FIGS. 3 and 4 illustrate examples of the positional relationships of ribs between the pieces of medical image data before the registration and at the predetermined stage in the registration, respectively. In FIG. 3, the shapes drawn with solid lines indicate the shapes of the ribs and the backbone in the medical image data, in a state before the registration, when the first medical image data set as the reference image data is viewed from the side surface of the subject, and R1, R2, R3, R4, and R5 indicate the individual ribs, respectively, and RB indicates the backbone. In FIG. 3, the shapes drawn with dotted lines indicate the shapes of the ribs and the backbone, in the state before the registration, when the second medical image data set as the floating image data is viewed from the side surface. F1, F2, F3, F4, and F5 indicate the individual ribs corresponding to the ribs R1, R2, R3, R4, and R5 in the first medical image data, respectively, and FB indicates the backbone. As seen from FIG. 3, the present example reveals that ribs between which the correspondence is shifted by one, like R2 and F1, R3 and F2, R4 and F3, and R5 and F4, are located at close positions instead of ribs corresponding to each other at the distal end portions of the ribs between the pieces of medical image data in the state before the registration. This shifting undesirably occurs due to a change in the posture, the breathing state, and/or the physical size of the subject between the pieces of medical image data.

Next, in FIG. 4, the shapes drawn with solid lines indicate the ribs in the first medical image data set as the reference image data at the predetermined stage in the first registration processing by the first registration unit 103, and R1 to R5 indicate similar contents to FIG. 3. In FIG. 4, the shapes drawn with dotted lines indicate the ribs in the second medical image data set as the floating image data at the predetermined stage in the registration processing, and F1 to F5 indicate similar contents to FIG. 3. FIG. 4 illustrates a result of an attempt of the first registration unit 103 to align closely located ribs with each other in the registration processing at the predetermined stage in the first registration processing. In the present example, the ribs R1 and F1, R2 and F2, R3 and F3, and R4 and F4 corresponding to each other are registered at close positions around the base portions of the ribs close to the backbones RB and FB. Meanwhile, FIG. 4 reveals that the ribs R2 and F1, R3 and F2, R4 and F3, and R5 and F4, between which the correspondence is shifted by one, are erroneously registered to positions close to each other at the distal end portions of the ribs away from the backbones RB and FB. In other words, each of the ribs in the floating image data is unintentionally transferred to the rib different from the corresponding one. This results in occurrence of locally distorted deformations at portions E1, E2, E3, and E4 between the bases and the distal ends of the ribs F1, F2, F3, and F4 in the second medical image data set as the floating image data. At such a portion where a distorted deformation locally occurs, an abnormal volume change occurs locally. More specifically, the ribs are incorrectly locally stretched at E1, E2, E3, and E4, and thus abnormal volume changes occur in the increase direction. Such a portion can be detected using the above-described equation (2). The determination unit 106 may perform the determination of a deformation abnormality with respect to the entire intermediate deformation information. The method for performing detection of an abnormally deformed region with respect to the intermediate deformation information by the determination unit 106 is not limited to the above-described method. For example, the determination unit 106 may be configured to detect, as a deformation abnormality, a portion having an extreme change in a displacement in a predetermined direction in a local region in the displacement field. A specific example thereof will be described now. As illustrated in FIG. 4, each of the ribs in the floating image data is unintentionally transferred to a rib different from the corresponding one in the vertical direction (the Z direction and the axial direction) of the subject on the way along the rib. The ribs are thus incorrectly stretched in the Z direction. Thus, the determination unit 106 detects, as an abnormally deformed region, a portion having an extreme change in the displacement in the Z direction in the medical image data. The determination unit 106 first sets a predetermined range (for example, a radius of 10 mm) around a predetermined position (x, y, z) in the displacement field, and calculates a maximum value $dz_{max}$ and a minimum value $dz_{min}$ (the unit is mm for each of them) of the displacement in the Z direction in the set range. Then, the determination unit 106 determines an abnormally deformed region according to a determination using a threshold value based on the maximum value $dz_{max}$ and the minimum value $dz_{min}$ of the displacement in the Z direction. More specifically, in a case where the condition expressed by the following equation is satisfied, the determination unit 106 determines that the range is an abnormally deformed region.

$$dz_{max} - dz_{min} > Th_2 \qquad (3)$$

The determination unit 106 can detect the change in the displacement in the Z direction in the predetermined range by calculating a difference between the maximum value $dz_{max}$ and the minimum value $dz_{min}$. $Th_2$ represents the predetermined threshold value, and, when $Th_2$ is, for example, $Th_2 = 20$, and in a case where the difference between the maximum value $dz_{max}$ and the minimum value $dz_{min}$ of the displacement in the Z direction in the local region exceeds 20 mm according to the equation (3), the determination unit 106 determines that an extreme change occurs in the displacement in the Z direction. Accordingly, the determination unit 106 can detect the region in which the rib is incorrectly stretched in the Z direction like E1, E2, E3, and E4 in FIG. 4 using the equation (3). In other words, the determination unit 106 performs determination of whether there is a deformation abnormality, based on the difference between the maximum value and the minimum value of the displacement in the displacement field. Even in a case of using a displacement in another direction other than the Z direction, the present method by the determination unit 106 can be employed by combining displacements in a plurality of directions. The determination unit 106 can perform the abnormality determination that is specialized in the rib transfer, by utilizing a characteristic of a deformation abnormality that likely occurs in the Z direction in a case where the rib transfer occurs between the images.

The method for detecting an abnormally deformed region in the intermediate deformation information by the determination unit 106 may be a combination of the above-described methods. For example, the determination unit 106 may be configured to detect a candidate region for an abnormally deformed region using the equation (2), further determine a predetermined range set around the candidate region, and perform the determination using the equation (3) with respect to the range, to determine a final abnormally deformed region.

The determination unit 106 may set the threshold value for determining a deformation abnormality (the above-described threshold values $Th_1$ and $Th_2$) to a different value for each site to which a pixel of interest belongs. For example, the determination unit 106 can reduce false detection by setting a large threshold value for an originally easily deformable site and a small threshold value for a less deformable site. The category of the site can be set to, for example, "bones and others" or "bones, a chest, and an abdomen". The category of site can be recognized using a known image recognition technique.

The method for performing detection of an abnormally deformed region with respect to the intermediate deformation information by the determination unit 106 may be any known method for detecting a deformation abnormality. The determination unit 106 can appropriately perform the abnormality determination for each site by factoring in the characteristic of the deformability for each site and changing the threshold value for the abnormality determination.

(S1040) (Normal?)

In step S1040, the determination unit 106 determines whether the registration normally progresses at the predetermined stage, based on a result of step S1030. The determination unit 106 performs the determination based on, for example, whether an abnormally deformed local region is present throughout the entire medical image data, with respect to the result of step S1030. In a case where the determination unit 106 determines that the registration normally progresses (YES in step S1040), the processing proceeds to step S1050. On the other hand, in a case where the determination unit 106 determines that the registration does not normally progress (NO in step S1040), the processing proceeds to step S1060. The determination of whether the registration normally progresses, performed by the determination unit 106, may include a setting of a predetermined dead zone, such as determining that the deformation is abnormal in a case where the volume of the local region exhibiting an abnormality is a predetermined value or larger. The determination method by the determination unit 106 may be a method other than performing the determination throughout the entire medical image data, and the determination unit 106 may perform the determination while limiting the target to a predetermined region of interest or may perform the determination while masking a region to exclude. For example, in a case where the determination unit 106 focuses on bone registration between the pieces of medical image data, the determination unit 106 may be configured to exclude (mask) regions other than bones from the regions targeted for the abnormality determination.

(S1050) (Resume First Registration from Stage Subsequent to Predetermined Stage)

In a case where the determination unit 106 determines that there is no deformation abnormality (YES in step S1040), in step S1050, the deformation unit 102 resumes the registration from the registration processing subsequent to the predetermined stage, which is the result of the registration processing up to the predetermined stage in the first registration processing including the plurality of stages, based on the intermediate deformation information generated in step S1030 by the first registration unit 103. Then, the first registration unit 103 acquires deformation information obtained by performing the registration up to the final processing in the first registration processing as first deformation information. Then, the first registration unit 103 of the deformation unit 102 outputs the first deformation information to the image data generation unit 107 as the final deformation information, which is finally determined deformation information. In the present exemplary embodiment, the displacement field for mapping corresponding positions between the pieces of medical image data is acquired as the final deformation information, similarly to step S1030.

Now, specific processing in the present step will be described. However, the specific processing method for the first registration processing by the first registration unit 103 is a method similar to step S1020, and thus the redundant description will be omitted here. In a case where the first registration processing by the first registration unit 103 is multiresolution registration processing including five stages and the first registration unit 103 has performed the registration up to the resolution corresponding to the third stage in step S1020, the following processing is performed. That is, the first registration unit 103 performs registration processing at resolutions corresponding to the remaining fourth and fifth stages using, as an input, the intermediate deformation information acquired based on the resolution corresponding to the third stage. In a case where the first registration processing is sequential processing of a combination of different registration methods (the affine registration, FFD, and LDDMM) and the processing up to the second stage has been performed in step S1020, the following processing is performed. That is, the first registration unit 103 performs registration processing based on remaining LDDMM using, as an input, the intermediate deformation information acquired from FFD at the second stage.

(S1060) (Perform Second Registration from Beginning)

In step S1060, the second registration unit 104 performs the second registration processing, different from the registration processing included in the first registration processing, from the beginning, and acquires deformation information obtained by the second registration processing as second deformation information. Then, the second registration unit 104 outputs the second deformation information to the image data generation unit 107 as the final deformation information that is the finally determined deformation information. In the present exemplary embodiment, the displacement field for mapping the pixel positions between the pieces of medical image data is acquired as the final deformation information, similarly to step S1030.

The second registration processing by the second registration unit 104 is a method that less likely leads to the deformation abnormality detected in step S1030 at least in comparison to the first registration processing. More specifically, in the present exemplary embodiment, the second registration processing by the second registration unit 104 is a registration method based on information about a specific local anatomical structure (hereinafter referred to as a local anatomical structure) of the subject in the medical image data. The local anatomical structure is, for example, each individual site of bones (a backbone, a rib, a skull bone, a pelvis, and the like). The local anatomical structure may be an anatomical structure other than bones. In this case, the information about the local anatomical structure of the subject based on which the second registration processing by the second registration unit 104 is performed includes information about the local region where the deformation abnormality has been detected in step S1030. For example, in the case where the local anatomical structure is the rib, the local anatomical structure includes the region where the distorted deformation has occurred due to the rib transfer in FIG. 4.

In this case, in the second registration processing by the second registration unit 104, a feature point of the local anatomical structure including the local region of the subject where the deformation abnormality has been detected in step S1030 in the medical image data is extracted from and recognized in each of the pieces of medical image data. Then, the second registration unit 104 performs processing for registering the pieces of medical image data in such a manner that the positions of the recognized local anatomical structures match each other between the pieces of medical image data. More specifically, in a case where the deformation abnormality in the ribs like the example illustrated in FIG. 4 is detected by the determination unit 106, the second registration unit 104 extracts and recognizes each of feature points of the distal end, the central position, the base, and the like for each individual rib of the subject. Then, the second registration unit 104 performs the registration processing in such a manner that the feature points of the corresponding ribs are aligned. In this process, the second registration unit 104 can extract and recognize the feature points of the individual rib region using a known region extraction technique or feature point extraction technique based on image processing, machine learning, or an atlas. A method for aligning, in addition to the corresponding feature points, the position as a whole of the medical image data is desirable as the registration method for aligning the corresponding feature points between the pieces of medical image data. Examples employable as the method include a method in which, in addition to the image similarly, the degree of matching between the feature points are incorporated in the evaluation function in the above-described method, FFD, the Demons algorism, or LDDMM. Alternatively, the second registration unit 104 may be configured to perform the registration based on the above-described image similarity after performing registration for aligning the feature points using the Thin Plate Spline (TPS) method or the like.

Like the above-described example, it is desirable that a plurality of pieces of information about the local anatomical structure is used for the second registration processing by the second registration unit 104. This is because individually recognizing the plurality of ribs adjacent in the vertical direction of the subject, like the above-described example, leads to registration of the plurality of ribs without making a mistake. The information about the local anatomical structure that is used in the second registration processing by the second registration unit 104 does not necessarily have to be the feature point, and information about the region or the shape of the local anatomical structure may be used instead of the feature point. In this case, for example, the second registration unit 104 first samples points in the region or on the shape of the local anatomical structure and maps point groups using a known technique for mapping between point groups. Then, the registration can be performed by a method in which the image similarity and the degree of matching between feature points are incorporated in the evaluation function similarly to the above-described method that aligns the corresponding feature points by the second registration unit 104.

The second registration processing by the second registration unit 104 is based on the information about the specific local anatomical structure of the subject. Consequently, the performance of the second registration processing in the registration regarding the specific local anatomical structure is higher than the method, like the first registration processing, for evenly handling the entire medical image data not based on the information about the specific local anatomical structure. On the other hand, because the second registration processing by the second registration unit 104 requires special processing based on the local anatomical structure of the subject, the second registration processing takes a longer time than the first registration processing. Alternatively, the second registration processing is highly likely unable to be freely applied to variations of medical image data in which imaged sites of the subject are variously different. However, the second registration processing by the second registration unit 104 is performed in a case where a deformation abnormality is detected in step S1030. As a whole of the present exemplary embodiment, the deformation unit 102 applies the first registration processing until the end to most of variations of various pieces of medical image data, and applies the second registration processing to a case in which a deformation abnormality is detected. Due to this configuration, the present exemplary embodiment can reduce an influence due to the long processing time or the low versatility of the processing, which are disadvantages of the second registration processing. Further, the present exemplary embodiment can compensate for a failure in the first registration by utilizing the high accuracy of the registration including the specific local anatomical structure, which is an advantage of the second registration processing. In the case where the detection of a deformation abnormality in step S1030 is specialized in detecting a deformation abnormality in the specific local anatomical structure, registration processing specialized in reduction in occurrence of a deformation abnormality in the local anatomical structure can be set in advance as the second registration processing by the second registration unit 104. For example, in a case where the detection is specialized in detecting a deformation abnormality of the above-described rib transfer, the second registration processing is set to perform registration using the feature points and the shapes of the ribs like the above-described example, which leads to reduction in occurrence of a deformation abnormality in the ribs. On the other hand, in a case where the detection of a deformation abnormality in step S1030 is conducted site by site appropriately, the second registration processing specialized in reduction in occurrence of a deformation abnormality can be set according to the site (the local anatomical structure) in advance. With this configuration, the site where the abnormality is detected is identified, and thus the registration processing corresponding with the site can be selected. For example, in a case where the deformation abnormality is identified in the ribs, the image processing apparatus 100 performs registration using the feature points and the shapes of the ribs, and in a case where the deformation abnormality is identified in the backbone, the image processing apparatus 100 performs registration using the feature point and the shape of the backbone. In a case where the abnormality is identified in both the ribs and the backbone, The image processing apparatus 100 performs registration using the feature points and the shapes of both the ribs and the backbone. In this manner, the image processing apparatus 100 can perform appropriate registration processing according to the site where the abnormality is identified. In this case, the site where the abnormality is identified and the information about the site in use for the registration do not necessarily have to correspond to each other in a one-to-one manner, and the information about the site in use for the registration may be any information including at least the site where the abnormality is identified. For example, in a case where the abnormality is identified in the ribs, the image processing apparatus 100 can be configured to perform registration using the feature points and the shapes of a plurality of sites including the ribs.

(S1070) (Generate Resultant Image Data)

In step S1070, the image data generation unit 107 generates a resultant image data based on the final deformation information acquired by the processing in step S1050 or step S1060. In other words, the image data generation unit 107 generates a deformed image data of the second medical image data deformed in such a manner that the second medical image data is aligned with the first medical image data based on the acquired final deformation information. The image data generation unit 107 generates the subtraction image data obtained by subtracting the deformed image data of the second medical image data from the first medical image data. Then, the image data generation unit 107 outputs the generated resultant image data to the display control unit 108.

In the present exemplary embodiment, the generated resultant image data is stored in a not-illustrated storage unit. Due to this storage, the resultant image data can be easily acquired by reading from the storage unit in a case where the resultant image data is desired to be acquired again after the processing in the image processing apparatus 100 is ended. However, the generated resultant image data does not necessarily have to be stored in the not-illustrated storage unit.

Not both the deformed image data of the second medical image data and the subtraction image data necessarily have to be generated as the resultant image data. The image processing apparatus 100 may be configured to generate only any one of them.

(S1080) (Display Image Data)

In step S1080, the display control unit 108 performs control of displaying the cross-sectional image data of the resultant image data acquired from the intermediate deformation information acquisition unit 105 on the display unit 150. The display control unit 108 performs control of displaying the cross-sectional image data of the first medical image data and the second medical image data on the display unit 150.

The processing by the image processing apparatus 100 is performed in the above-described manner. More specifically, the image processing apparatus 100 includes the intermediate deformation information acquisition unit 105, which acquires the intermediate deformation information obtained by applying the registration processing up to the predetermined stage in the first registration processing including the plurality of stages on the first medical image data and the second medical image data acquired by the acquisition unit 101.

Further, the image processing apparatus 100 includes the determination unit 106, which performs determination on a deformation abnormality with respect to the intermediate deformation information, and the deformation unit 102, which performs, based on the result of the determination, the second registration processing at least partially including registration processing different from the first registration processing, and calculates the deformation information.

Since the image processing apparatus 100 is configured in the above-described manner, according to the present exemplary embodiment, a failure in the registration can be reduced by the determination unit 106 detecting a deformation abnormality in the first registration processing and the deformation unit 102 performing the registration in the second registration processing in which the abnormality is less likely occur. Further, the determination unit 106 performs detection of an abnormality with respect to the intermediate deformation information acquired by the intermediate deformation information acquisition unit 105 and the deformation unit 102 performs the second registration processing immediately, whereby the processing time can be prevented from unnecessarily increasing even in a case where the determination unit 106 detects a deformation abnormality.

The image processing apparatus 100 does not necessarily have to display or generate the deformed image data and the subtraction image data based on the final deformation information, and may be configured to only store the acquired deformation information into the storage unit. The image processing apparatus 100 may be configured to use the corresponding relationship of coordinates between the first medical image data and the second medical image data that is acquired from the acquired deformation information to process or analyze these pieces of medical image data. In other words, the image processing apparatus 100 may be configured in any manner as long as the image processing apparatus 100 is in use for using the result of the registration between the first medical image data and the second medical image data.

(First Exemplary Modification)

In the first exemplary embodiment, in step S1060, the registration using the specific positional information, such as the feature point, the region, the shape, or the like, of the specific local anatomical structure where the deformation abnormality is detected in the medical image data is employed as the second registration processing. However, the second registration processing does not necessarily have to be the method based on the identification of the specific position of the local anatomical structure. For example, a description is given of a case where the local anatomical structure where the deformation abnormality is detected is the ribs as illustrated in FIG. 4. In this case, characteristic bones, such as the skull bone, the collar bone, the backbone, and the pelvis are lined up in this order in the vertical direction when the subject is viewed from the front side, and consequently the backbone region can be relatively easily registered between images. Thus, on the assumption that the backbone region can be highly accurately registered between pieces of medical image data, the second registration unit 104 performs the registration between the pieces of medical image data, first focusing on the backbone region. Then, from there, the second registration unit 104 advances the registration while gradually widening the target region from the bases of the ribs toward the distal ends of the ribs. Such a method may be employed as the second registration processing.

More specifically, the second registration unit 104 divides an image region in the medical image data radially into a plurality of regions based on the central point of the subject, as viewed on the axial plane of the three-dimensional image data. Then, the second registration unit 104 performs the registration on the divided region containing the backbone as a first registration target, and next performs the registration again while adding a divided region adjacent thereto to the target. Then, the second registration unit 104 repeats processing for performing the registration while adding an adjacent divided region to the target until the target region covers the entire medical image data. For example, in a case where the medical image data is divided radially into 12 regions based on the central point of the subject when being viewed on the axial plane, the second registration unit 104 sets two divided regions containing the backbone as a first registration target region. Then, the second registration unit 104 performs the registration while adding an adjacent divided region one by one on each of the left side and the right side at the same time gradually from the back side toward the abdomen side in order, and lastly performs the registration on the entire image containing two divided regions on the abdomen side. In this manner, the registration progresses while the target region is gradually expanded from the backbone toward the distal ends of the ribs. Accordingly, even in a case where the corresponding relationship of the ribs before the registration is in a state that the correspondence is shifted by one as illustrated in FIG. 3, the registration progresses in order from the bases of the ribs while the corresponding relationship at the distal ends of the ribs is ignored during the first half of the registration processing in the second registration processing. Therefore, the image processing apparatus 100 can prevent such a failure in the registration that the distal ends of the ribs are erroneously associated with (transferred to) other ribs as illustrated in FIG. 4.

(Second Exemplary Modification)

In the first exemplary embodiment, the registration is performed again from the beginning in the second registration processing by the second registration unit 104 in step S1060. However, the second registration processing is not necessarily limited to the method in which the registration is performed again from the beginning. For example, a description is given of a case where the first registration processing includes rough initial registration processing at the former stage and precise registration processing at the latter stage, and the rough initial registration processing is, for example, rigid registration or affine registration between the pieces of image data. In this case, basically, no local deformation abnormality occurs in the rough initial registration processing. Consequently, in the second registration processing by the second registration unit 104, the rough initial registration processing is factored in as common processing shared with the first registration processing, deformation information at the stage of the rough initial registration in the first registration processing is acquired as initial deformation information. Then, the second registration unit 104 performs the registration by the method described in step S1060 using the initial deformation information as an initial value therefor. As a result, the second registration unit 104 can start the second registration processing from the state where the positions are aligned between the pieces of medical image data to some degree, in comparison to a case where the second registration processing is performed from the beginning, whereby the registration can be completed in a shorter time.

In the first exemplary embodiment, the determination of a deformation abnormality with respect to the first registration processing performed by the determination unit 106 is once at the predetermined stage. On the other hand, in a second exemplary embodiment, the determination unit 106 performs the determination about an abnormality each time one stage of registration processing in the first registration processing is performed. A description will be given of the processing according to the present exemplary embodiment. The image processing system according to the present exemplary embodiment is similar to FIG. 1, and thus the redundant description will be omitted. Steps S2010, S2030, and S2060 to S2080 in a flowchart in FIG. 5 illustrating an overall processing procedure performed by the image processing apparatus 100 are similar to steps S1010, S1030, and S1060 to S1080 according to the first exemplary embodiment, and thus the redundant descriptions will be omitted. In the following description, the present exemplary embodiment will be described focusing on differences from the first exemplary embodiment illustrated in the flowchart of FIG. 2.

(S2020) (Perform First Registration by One Stage)

In step S2020, the first registration unit 103 performs the first registration processing by one stage, in which the first medical image data and the second medical image data are registered to substantially align pixels indicating the same site between the first medical image data and the second medical image data, and calculates the intermediate deformation information. The intermediate deformation information acquisition unit 105 acquires the intermediate deformation information calculated by the first registration unit 103, and transmits it to the determination unit 106. In this process, the first registration unit 103 stores the intermediate deformation information acquired from the registration processing at this time to use the intermediate deformation information as an initial value of the registration at the time of the next registration. In the present exemplary embodiment, the displacement field between the pieces of medical image data is calculated as the intermediate deformation information similarly to the first exemplary embodiment. The first registration by the first registration unit 103 according to the present exemplary embodiment is a similar method to the first exemplary embodiment, and thus the redundant description will be omitted. The first registration processing by the first registration unit 103 according to the present exemplary embodiment is processing including a plurality of stages similarly to the first exemplary embodiment. The details of the processing including the plurality of stages is similar to the first exemplary embodiment, and thus the redundant description will be omitted. In this processing, in the first exemplary embodiment, the intermediate deformation information acquisition unit 105 acquires, as the intermediate deformation information, the displacement field of when the registration is performed from the beginning to the predetermined stage while handling the registration processing at the predetermined stage among the plurality of stages as the predetermined stage. On the other hand, in the present exemplary embodiment, the intermediate deformation information acquisition unit 105 acquires, as the intermediate deformation information, a displacement field of when registration processing corresponding to one stage among the plurality of stages is performed.

In a case where the first registration processing by the first registration unit 103 is multiresolution processing, registration processing corresponding to one resolution or a predetermined number of resolutions (for example, corresponding to resolutions by two stages) is handled as one stage of registration processing. In a case where the first registration processing is a combination of different types of registration methods (for example, the affine transformation, FFD, and LDDMM), a unit of individual registration method is handled as one stage of processing. In a case where the first registration processing is processing using the iterative calculation in the optimization processing, a set of a predetermined number of steps (for example, corresponding to 10 steps) is handled as one stage.

In a case where currently performing registration processing is the processing at the first stage in the first registration processing, the first registration unit 103 performs registration processing at the first single stage. On the other hand, in a case where currently performing registration processing is the processing in a state that at least one stage of registration processing included in the first registration processing has been already performed, the first registration unit 103 performs the first registration processing by one stage using the prestored displacement field acquired from the previous registration as an initial value.

(S2040) (Normal?)

In step S2040, the determination unit 106 performs determination of whether the registration normally progresses, with respect to the intermediate deformation information obtained by the registration processing at the predetermined stage in the first registration processing including the plurality of stages, based on the result of step S2030. In this process, the method for the determination by the determination unit 106 is similar to the first exemplary embodiment. Then, in a case where the determination unit 106 determines that the registration normally progresses (YES in step S2040), the processing proceeds to step S2050. On the other hand, if the determination unit 106 determines that the registration does not normally progress (NO in step S2040), the processing proceeds to step S2060.

(S2050) (End First Registration?)

In step S2050, the first registration unit 103 determines whether to end the first registration. In a case where the first registration unit 103 determines to end the first registration (YES in step S2050), the currently stored intermediate deformation information is output to the image data generation unit 107 as the final deformation information. Then, the processing proceeds to step S2070.

In a case where the first registration unit 103 determines not to end the first registration (NO in step S2050), the processing returns to step S2020.

The processing by the image processing apparatus 100 is performed in the above-described manner.

According to the present exemplary embodiment, the determination about a deformation abnormality is performed for each stage in the first registration processing, and consequently the determination unit 106 can find a deformation abnormality at an earlier stage compared to the first exemplary embodiment. Further, due to this configuration, the deformation abnormality can be recovered with the aid of the second registration processing by the second registration unit 104 of the deformation unit 102. Therefore, the processing time when a deformation abnormality is found can be reduced compared to the first exemplary embodiment.

The technique disclosed in the present specification can be implemented as an embodiment in the form of, for example, a system, an apparatus, a method, a program, or a recording medium (a storage medium). More specifically, the disclosed technique may be applied to a system including a plurality of devices (for example, a host computer, an interface device, an imaging device, a web application, and the like), or may also be applied to an apparatus including one device.

It is apparent that the purpose of the technique disclosed in the present specification can be achieved in the following manner. That is, a recording medium (or a storage medium) recording therein a program code (a computer program) of software capable of fulfilling the functions of the above-described exemplary embodiments is supplied to a system or an apparatus. It is apparent that this storage medium is a computer-readable storage medium. Then, a computer (or a central processing unit (CPU) or a micro processing unit (MPU)) in this system or apparatus reads out the program code stored in the recording medium and executes it. This case means that the program code itself read out from the recording medium fulfills the functions of the above-described exemplary embodiments and the recording medium recording this program code therein constitutes the technique disclosed in the present specification.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-123598, filed Jul. 28, 2021, which is hereby incorporated by reference herein in its entirety.

What is claimed is:

1. An image processing apparatus comprising:
an acquisition unit configured to acquire first medical image data and second medical image data obtained by imaging a subject;
a first registration unit configured to perform first registration processing between the first medical image data and the second medical image data, including a plurality of consecutive processing stages in association with an intermediate deformation process, wherein in each processing stage of the plurality of consecutive processing stages, a displacement field between a current first medical image data and a current second medical image data is updated, and the updated displacement field is passed to the next processing stage;
a second registration unit configured to perform second registration processing based on information about a specific local anatomical structure in the first medical image data and the second medical image data and different from the first registration processing, which is not based on information about the specific local anatomical structure;
an intermediate deformation information acquisition unit configured to acquire intermediate deformation information based on the updated displacement field in the plurality of consecutive processing stages; and
a determination unit configured to perform determination of whether a deformation abnormality in association with a registration failure in the first registration processing is present or not, based on the intermediate deformation information, wherein, in a case where the deformation abnormality is present in the plurality of consecutive processing stages, as determined by the determination unit, the first registration processing is aborted and the second registration processing is started based on the first medical image data and the second medical image data, and wherein, in a case where the deformation abnormality is absent in the plurality of consecutive processing stages, as determined by the determination unit, the first registration processing is consequently continued from a current processing stage, of the plurality of consecutive processing stages, to a next processing stage of the plurality of consecutive processing stages until a designated stage.

2. The image processing apparatus according to claim 1, wherein the second registration processing is registration processing that does not use the intermediate deformation information.

3. The image processing apparatus according to claim 1, wherein the intermediate deformation information is a displacement field storing therein a displacement vector for mapping between pixels included in the first medical image data and the second medical image data, and wherein the determination unit is configured to perform determination of whether the deformation abnormality in the first registration processing is present based on the displacement field.

4. The image processing apparatus according to claim 3, wherein the determination unit is configured to perform determination of whether the deformation abnormality is present, based on information about a volume change in the displacement field.

5. The image processing apparatus according to claim 3, wherein the determination unit is configured to perform determination of whether the deformation abnormality is present, based on a difference between a maximum value and a minimum value of a displacement in the displacement field.

6. The image processing apparatus according to claim 3, wherein the determination unit is configured to perform determination of whether the deformation abnormality is present, according to a determination using a threshold value.

7. The image processing apparatus according to claim 3, wherein the determination unit is configured to perform determination of whether the deformation abnormality is present in a local region in the displacement field.

8. The image processing apparatus according to claim 7, wherein, in a case where a volume in the displacement field that is occupied by the local region is a predetermined value or greater, the determination unit determines that the deformation abnormality is present.

9. The image processing apparatus according to claim 7, wherein the second registration processing performs registration processing based on information about an anatomical structure contained in the local region determined to have the deformation abnormality therein by the determination unit.

10. The image processing apparatus according to claim 1, wherein the determination unit is configured to perform determination of whether the deformation abnormality is present based on the intermediate deformation information at the plurality of consecutive processing stages included in the first registration processing.

11. The image processing apparatus according to claim 1, wherein the designated stage is not a final stage among the plurality of consecutive processing stages.

12. The image processing apparatus according to claim 1, wherein, in a case where the determination unit determines whether the deformation abnormality is present based on the intermediate deformation information obtained by applying the first registration processing up to a predetermined stage of the plurality of consecutive processing stages, the second registration unit does not perform second registration processing on any of the plurality of consecutive processing stages subsequent to the predetermined stage.

13. An image processing method comprising:
acquiring first medical image data and second medical image data obtained by imaging a subject;
performing first registration processing between the first medical image data and the second medical image data, including a plurality of consecutive processing stages in association with an intermediate deformation process, wherein in each processing stage of the plurality of consecutive processing stages, a displacement field between a current first medical image data and a current second medical image data is updated, and the updated displacement field is passed to the next processing stage;
acquiring intermediate deformation information based on the updated displacement field in the plurality of consecutive processing stages;
performing determination of whether a deformation abnormality in association with a registration failure in the first registration processing is present or not, based on the intermediate deformation information; and
performing second registration processing based on information about a specific local anatomical structure in the first medical image data and the second medical image data and different from the first registration processing, which is not based on information about the specific local anatomical structure,
wherein, in a case where the deformation abnormality is present as determined in the step of performing determination in the plurality of consecutive processing stages, performing the first registration processing is aborted and the performing the second registration processing is started based on the first medical image data and the second medical image data, and
wherein, in a case where the deformation abnormality is absent in the plurality of consecutive processing stages, as determined in performing the determination, the first registration processing is consequently continued from a current processing stage, of the plurality of consecutive processing stages, to a next processing stage of the plurality of consecutive processing stages until a designated stage.

14. A non-transitory storage medium storing a program for causing a computer to perform the image processing method according to claim 13.

15. The image processing apparatus according to claim 1, wherein the first medical image data and the second medical image data are each three-dimensional medical image data.

16. The image processing apparatus according to claim 15, wherein the three-dimensional medical image data are configured as a set of pieces of two-dimensional tomographic image data.

17. The image processing apparatus according to claim 1, wherein the first medical image data and the second medical image data have images captured at same timing using different modalities or different imaging modes.

18. The image processing apparatus according to claim 15, wherein a modality of the three-dimensional medical image data is a magnetic resonance imaging (MRI) modality, a three-dimensional ultrasonic imaging modality, a photoacoustic tomography modality, a positron emission tomography (PET)/single-photon emission computerized tomography (SPECT) modality, or an optical coherence tomography (OCT) modality.

19. The image processing apparatus according to claim 1, wherein the performing of the second registration processing needs more time than the performing of the first registration processing.

20. The image processing apparatus according to claim 1, wherein the determination unit is configured to perform determination of whether an abnormality in association with an occurrence of a locally distorted deformation in the plurality of consecutive processing stages is present or not.

21. The image processing apparatus according to claim 1, wherein the determination unit is configured to perform determination of whether an abnormality in association with the registration failure is present or not in the plurality of consecutive processing stages based on a comparison of a volume change of the displacement field and a predetermined threshold value.

22. An image processing apparatus comprising:
an acquisition unit configured to acquire first medical image data and second medical image data obtained by imaging a subject;
a first registration unit configured to perform first registration processing between the first medical image data and the second medical image data, including a plurality of consecutive processing stages in association with an intermediate deformation process, wherein in each processing stage of the plurality of consecutive processing stages, a displacement field between a current first medical image data and a current second medical image data is updated, and the updated displacement field is passed to the next processing stage;
a second registration unit configured to perform second registration processing based on information about a specific local anatomical structure in the first medical image data and the second medical image data and different from the first registration processing, which is not based on information about the specific local anatomical structure;
an intermediate deformation information acquisition unit configured to acquire intermediate deformation information in the plurality of consecutive processing stages; and
a determination unit configured to perform determination of whether an abnormality in association with a registration failure is present or not in the plurality of consecutive processing stages based on a comparison of a volume change of the displacement field and a predetermined threshold value; and
wherein, in a case where the deformation abnormality is present in the plurality of consecutive processing stages, as determined by the determination unit, the first registration processing is aborted and the second registration processing is started based on the first medical image data and the second medical image data, and
wherein, in a case where the deformation abnormality is absent in the plurality of consecutive processing stages, as determined by the determination unit, the first registration processing is consequently continued from a current processing stage, of the plurality of consecutive processing stages, to a next processing stage of the plurality of consecutive processing stages until a designated stage.

* * * * *